(12) United States Patent
Thompson et al.

(10) Patent No.: US 10,337,944 B2
(45) Date of Patent: *Jul. 2, 2019

(54) METHOD AND APPARATUS FOR TURBINE ENGINE ROTOR AUTOMATIC SELF BALANCING

(71) Applicant: Siemens Energy, Inc., Orlando, FL (US)

(72) Inventors: Edward David Thompson, Casselberry, FL (US); David R. Tiffany, Winter Park, FL (US); Benjamin E. Bassford, IV, Orlando, FL (US)

(73) Assignee: SIEMENS ENERGY, INC., Orlando, FL (US)

( * ) Notice: Subject to any disclaimer, the term of this patent is extended or adjusted under 35 U.S.C. 154(b) by 247 days.

This patent is subject to a terminal disclaimer.

(21) Appl. No.: 15/417,301

(22) Filed: Jan. 27, 2017

(65) Prior Publication Data

US 2018/0113047 A1 Apr. 26, 2018

Related U.S. Application Data

(63) Continuation of application No. 14/302,497, filed on Jun. 12, 2014, now Pat. No. 9,588,007.

(51) Int. Cl.
*G01M 1/36* (2006.01)
*F01D 5/02* (2006.01)

(52) U.S. Cl.
CPC ............... *G01M 1/36* (2013.01); *F01D 5/027* (2013.01)

(58) Field of Classification Search
CPC .................................. G01M 1/36; F01D 5/027
See application file for complete search history.

(56) References Cited

U.S. PATENT DOCUMENTS

| | | | | |
|---|---|---|---|---|
| 4,867,006 A | * | 9/1989 | Giberson | F01D 5/027 74/433.5 |
| 5,007,305 A | * | 4/1991 | Linder | G01M 1/36 451/343 |
| 6,210,099 B1 | * | 4/2001 | Hugbart | F16F 15/36 415/119 |
| 6,322,299 B1 | * | 11/2001 | Hartman | B23B 31/006 408/143 |
| 8,308,435 B2 | * | 11/2012 | Storace | G01M 1/22 416/145 |

* cited by examiner

*Primary Examiner* — John E Chapman, Jr.

(57) ABSTRACT

An online real time steam or gas turbine engine rotor balancing system is incorporated in a rotor balance plane. A selectively displaceable balancing weight is coupled to the rotor and is selectively displaced by a motor that is coupled to the balancing weight. The motor selectively displaces the balancing weight along a displacement path that is in the balance plane. A turbine engine rotor vibration monitoring system monitors rotor vibration in real-time. A control system is coupled to rotor vibration monitoring system and the motor, for determining in real time a desired balance weight displacement position to counteract the monitored rotor vibration. The controller selectively causes the motor to displace the balancing weight to the desired displacement position. The motor power source is an inductive power source or a permanent magnet generator.

20 Claims, 7 Drawing Sheets

METHOD AND APPARATUS FOR TURBINE ENGINE ROTOR AUTOMATIC SELF BALANCING

CROSS-REFERENCE TO RELATED APPLICATIONS

This application claims the benefit of U.S. patent application Ser. No. 14/302,497 filed on Jun. 12, 2014, the disclosure of which is hereby incorporated by reference herein.

TECHNICAL FIELD

The invention relates to systems and methods for operational turbo machinery, such as steam or combustion gas turbine engines, vibration monitoring and automatic balancing of the rotor/shaft in response to the monitored vibration. More particularly the invention relates to motorized balancers coupled to shaft/rotor balancing rings that displace balancing weights to counteract the monitored vibration. The motors are controlled by a control system that determines in real time a desired balance weight displacement position to counteract the monitored vibration and causes the motor to displace the balancing weight to the desired displacement position.

BACKGROUND OF THE INVENTION

Turbo-machinery shafts generally require rotational mechanical balancing to avoid vibration when they are at running speed. FIG. 1 shows an exemplary known compressor and torque tube portion of a combustion turbine rotor 20, comprising a rotor shaft 22 and balancing rings 24. As is well-known, the rotor typically includes a bore 188 that extends along the rotational axis of the rotor. The bore 188 is formed during manufacturing to remove impurities that tend to form or collect near the rotational axis during the manufacturing process. The turbine section portion of the known rotor is not shown. The balancing rings' locations are often referred to as "balance planes" that are perpendicular to the rotor's rotational axis. Threaded plugs 26 are inserted into threaded bores that are arrayed about the rotor at the plane. Other methods of installing balance weights such as capturing the weight in a toothed slot, or other methods may be used in some applications.

During initial fabrication of the rotor 20 prior to initial balancing rotor vibrations are monitored during a spinning procedure. For previously operational rotors during service refurbishment prior history of monitored rotor vibration is also often utilized. For either new or refurbished rotors, the monitored vibrations are used to determine a balance weight array pattern of weight and bore locations along the balance plane that will be expected to counteract the monitored vibration. In a so-called "balance move" service procedure, the rotor is brought to a standstill and the balancing weights are installed in accordance with the previously determined balance weight array pattern. The balance move procedure is repeated iteratively, if necessary, to establish rotor balance within functional specifications. Upon completion of the balancing procedure the balancing weight mass and positions remain static until the next rotor service outage.

During turbo-machine operation, such as combustion turbine engine operation, a rotor 20 can become out of balance due to disassembly and reassembly during maintenance, normal wear of seals and other components, engaging of clutches, or thermal expansion of the rotor. If the rotor 20 out of balance condition is not so severe as to require immediate turbine engine shut down, the engine may continue to be operated until the next scheduled maintenance outage, but nonetheless at a higher than desired vibration level. If vibration levels increase beyond acceptable specifications the turbine engine may have to be shut down for balancing maintenance ahead of the next scheduled outage, resulting in an unscheduled engine service disruption.

SUMMARY OF THE INVENTION

Accordingly, a suggested object of the invention is to perform automatic turbo machinery shaft balancing, such as automatic steam or combustion turbine rotor balancing, during machine/engine operation, in order to compensate for new imbalances developed during such operation or to tune vibration performance during such operation.

Another suggested object of the invention is to perform automatic turbo machinery shaft balancing, such as automatic steam or combustion turbine rotor balancing, after initial shaft/rotor fabrication or after service refurbishment, so as to reduce or eliminate the need to perform single or repetitive manual "balance moves" of static balancing weights at one or more of the balance planes, by inserting the balance weights into one of a ring of threaded holes, a weight inserted into a toothed slot in the rotor, or any other static method of attaching a balance weight to the rotor.

These and other objects are achieved, in one or more embodiments of the invention, by an online real time turbomachinery steam or gas turbine engine rotor balancing system, which is incorporated in the rotor, such as in a balancing ring. A selectively displaceable balancing weight is coupled to the rotor at a balance plane and is selectively displaced by a motor that is coupled to the balancing weight . . . . The motor selectively displaces the balancing weight along a displacement path in the balance plane. A turbine engine rotor vibration monitoring system monitors rotor vibration in real-time. A control system is coupled to rotor vibration monitoring system and the motor, for determining, in real time, a desired balance weight displacement position to counteract the monitored rotor vibration. The controller selectively causes the motor to displace the balancing weight to the desired displacement position. In described exemplary embodiments of the invention the motor power source is an inductive power source or a permanent magnet generator or other known power source.

Embodiments of the invention feature an online real time rotor balancing system for steam or combustion gas turbine engines, which includes a rotor having a rotation axis and one or more balance planes. A selectively displaceable balancing weight is coupled to the rotor. A motor is coupled to the balancing weight for selectively displacing the balancing weight along a displacement path in the balance plane. A turbine engine rotor vibration monitoring system monitors rotor vibration in real-time. A control system coupled to rotor vibration monitoring system and the motor determines, in real time, a desired balance weight displacement position to counteract the monitored rotor vibration and selectively causes the motor to displace the balancing weight to the desired displacement position.

Other embodiments of the invention feature a method for online real time steam or combustion gas turbine engine rotor balancing by providing a turbine engine including a rotor having a rotation axis and one or more balance planes. The provided turbine engine further includes a selectively displaceable balancing weight that is coupled to the rotor. A motor is coupled to the balancing weight for selectively displacing the balancing weight along a displacement path in the balance plane. A turbine engine rotor vibration monitoring system monitors rotor vibration in real-time. Further, a control system is provided that is in turn coupled to rotor vibration monitoring system and the motor. The control system determines in real time a desired balance weight displacement position to counteract the monitored rotor vibration and selectively causes the motor to displace the balancing weight to the desired displacement position. The method is further performed by operating the turbine engine and monitoring operational rotor vibration with the vibration monitoring system. The controller determines in real time a desired balance weight displacement position to counteract the monitored rotor vibration; and causes the motor to displace the balancing weight to the desired displacement position. A weight position sensing system is provided in some exemplary embodiments to provide sensed weight position information to the controller. The sensed weight position is utilized by the controller as a control parameter for determining the desired weight position.

Additional embodiments of the invention feature a gas turbine engine, comprising compressor, combustor and turbine sections. A rotor is captured within the engine, having a rotation axis and one or more balance plane(s). A selectively displaceable balancing weight is coupled to the rotor. A motor is coupled to the balancing weight for selectively displacing the balancing weight along a displacement path in the balance plane. A turbine engine rotor vibration monitoring system is coupled to the engine, for monitoring rotor vibration in real-time. A control system is coupled to rotor vibration monitoring system and the motor, for determining in real time a desired balance weight displacement position to counteract the monitored rotor vibration and for selectively causing the motor to displace the balancing weight to the desired displacement position.

The respective objects and features of the invention embodiments may be applied jointly or severally in any combination or sub-combination by those skilled in the art.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

After considering the following description, those skilled in the art will clearly realize that the teachings of various embodiments of the invention can be utilized in a motorized vibration balancer that is coupled to shaft/rotor at a balance plane, such as in a balancing ring. One or more motors displace one or more respective balancing weights to counteract monitored vibration, such as monitored vibration detected by a turbine engine vibration monitoring system. The motors are controlled by a control system that determines in real time a desired balance weight displacement position to counteract the monitored vibration and causes the motor to displace the balancing weight to the desired displacement position. In exemplary embodiments of the invention, one or more balancing weights have displacement paths that may be non-orthogonally aligned on one or more balance planes that are perpendicular to the rotor/shaft rotational axis. In exemplary embodiments the respective weight displacement paths are directed on the balance plane radially or tangentially relative to the rotor rotational axis. In other exemplary embodiments of the invention a balancing weight displacement sensor provides sensed weight displacement information that is coupled to the controller. The controller utilizes the sensed weight displacement information as a control parameter for determining the desired weight displacement position. In embodiments of the invention the motors are powered by a motor power source comprising an inductive power source having a stationary coil external to the rotor and a moving coil coupled to the rotor. In other embodiments the power source is a permanent magnet generator power source having a stationary magnet and at least one moving coil coupled to the rotor. Other power sources may be applicable to the envisioned design.

Figure 1:
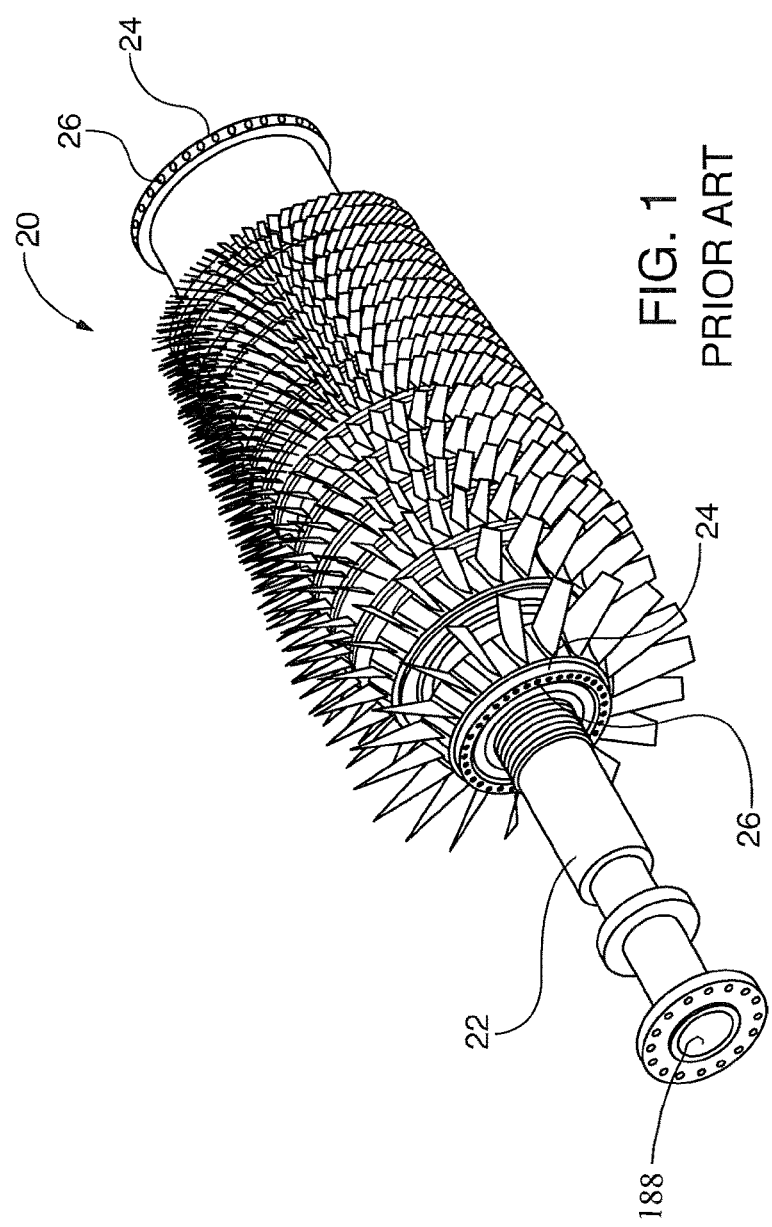
FIG. 1 is a perspective view of a known combustion turbine compressor section and torque tube portion of a rotor.
Figure 2:
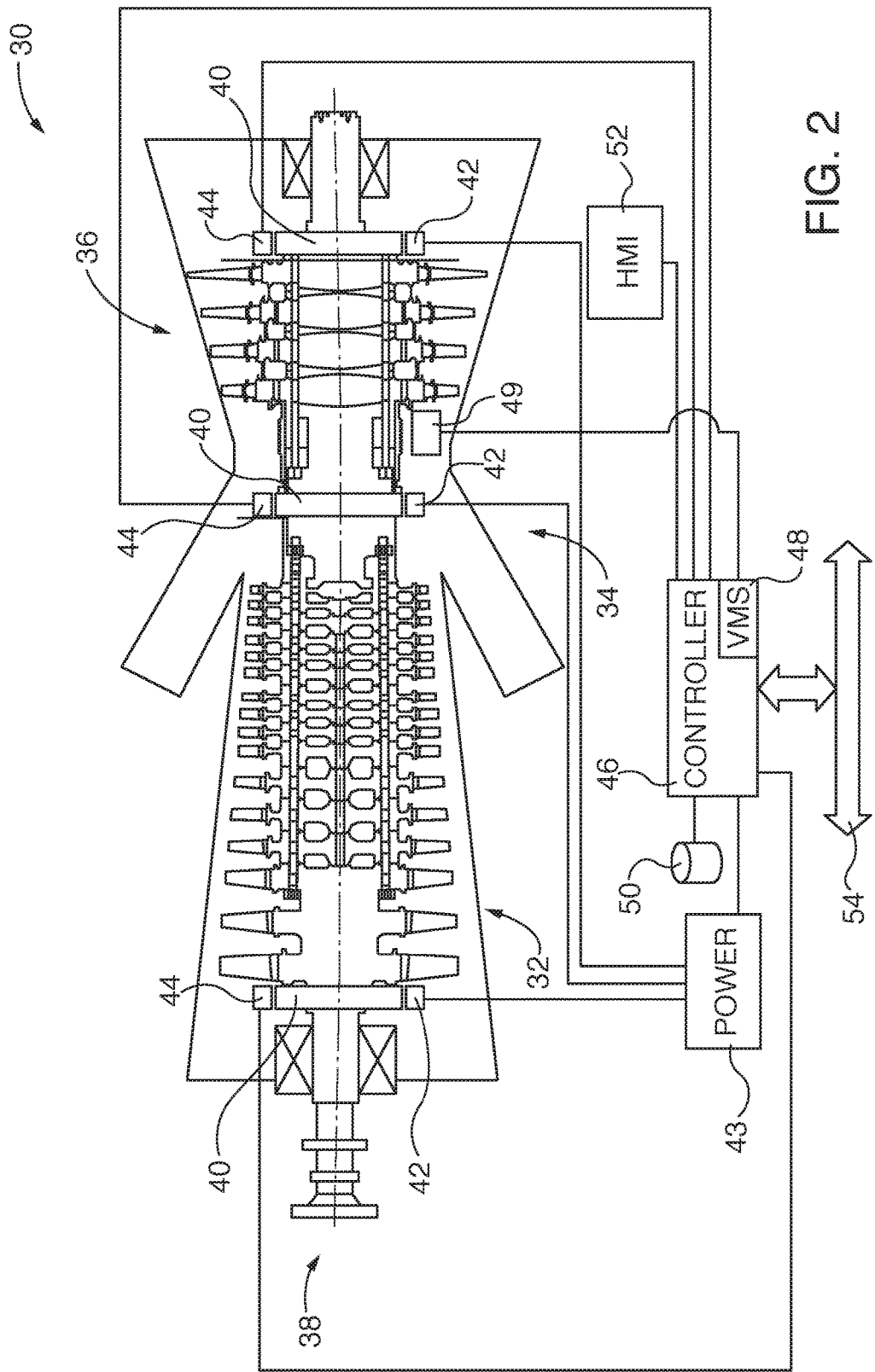
FIG. 2 is a elevational cross section schematic view of a combustion turbine engine including an embodiment of a turbine engine rotor automatic balancing system in accordance with an embodiment of the invention.
Figure 3:
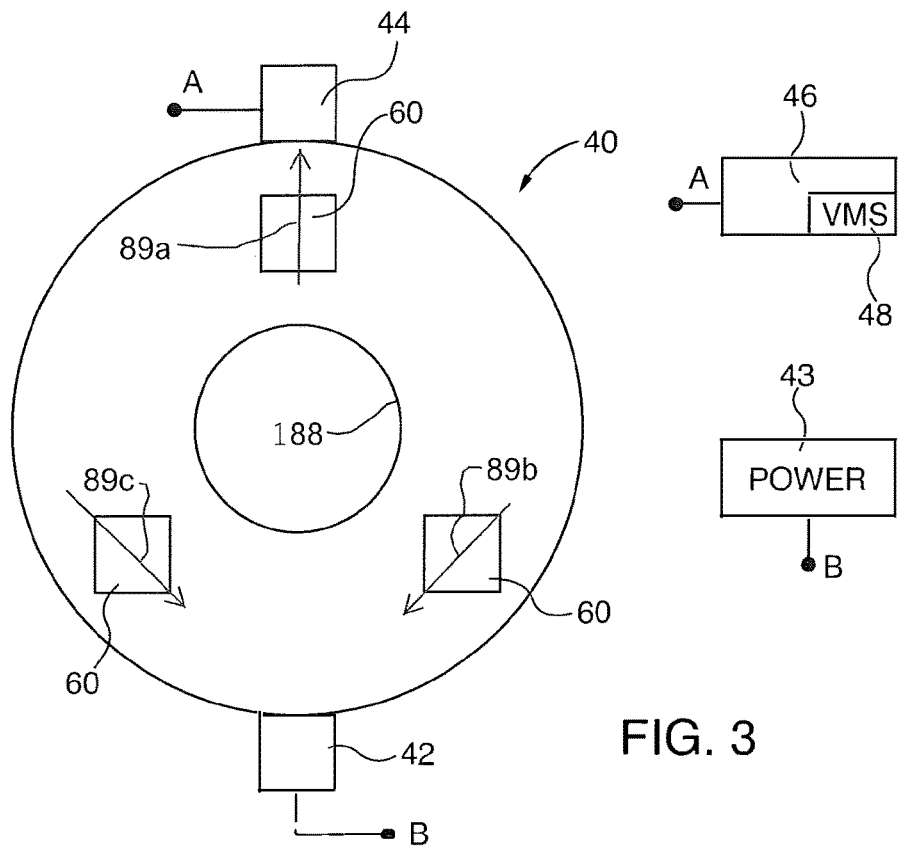
FIG. 3 is an axial cross sectional view of a balancing ring of a turbine engine rotor automatic balancing system of FIG. 2, including an exemplary array of three motorized balancers.

FIGS. 2 and 3 show an embodiment of the turbo-machinery automatic self-balancing system in an exemplary combustion turbine engine 30 that includes a compressor section 32, a combustion section 34 with a ring of combustors, a turbine section 36 and a rotor 38 that is rotatively mounted with the aforementioned turbine sections. The exemplary rotor 38 has three balancing rings 40 that define balance planes normal to the rotor's rotational axis. Motorized balancers 60 may be non-orthogonally aligned on the balance plane. In other words, the balancers 60 each define a displacement path 89*a*, 89*b*, 89*c* as will be described in greater detail. Each displacement path 89*a*, 89*b*, 89*c* of FIG. 3 is arranged at a non-orthoganal angle with respect to the other two displacement paths 89*a*, 89*b*, 89*c*. While FIGS. 2 and 3 show an exemplary rotor 38 with three balance planes and three motorized balancers 60 in each balancing ring 40, an operational self-balancing system can be constructed with at least one or greater desired number of balance planes and at least one motorized balancer in each balance plane. Power is supplied to the motorized balancers 60 by a balancer power system including a stationary balancer power transfer device 42 mounted near the balance plane 40 (or anywhere within the rotor structure so long as power is transferred to the motorized balancers) and a balancer power source 43 that is coupled to the balancer power transfer device. As will be described in greater detail herein with respect to FIGS. 4-9, various embodiments of the motorized balancers 60 incorporate displaceable balancing weights that are displaced by motors 60 and their respective powered motor shafts 64.

Sensor 44 is mounted near the balance plane 40 for monitoring operation of the motorized balancers 60 in the ring, for determining sensed weight displacement, generating sensed weight displacement information. Each sensor 44 is coupled to balance system controller 46 and provides sensed weight displacement information to the controller. The controller 46 is in communication with the turbine engine 30 vibration monitoring system (VMS) 48 that receives monitored engine vibration information provided by one or more VMS sensors 49. As shown in FIG. 2, the VMS 48 is incorporated into the controller 46, which may be structurally or operationally incorporated into the turbine engine 30 overall operational control system. The controller 46 is optionally coupled to a balancing system data storage device 50, a human machine interface (HMI) 52 for providing operational information about the automatic balancing system to human operators and a communications pathway 54, all of which may be incorporated into the overall turbine engine 30 operational monitoring and control system (not shown). In the exemplary embodiment of FIG. 2, the sensor 44 sensed weight displacement information is utilized by the controller 46 and functions as a control parameter for determining the desired weight displacement position, desirably in a feedback control loop along with the VMS 48 monitored engine vibration information.

Exemplary embodiments of motorized balancer systems 60 are shown in detail in FIGS. 4-9. All of these embodiments functionally utilize a motor 62 to displace selectively a displacement weight along a displacement path that may be non-orthogonally aligned with its respective balancing ring 140 balance plane. Exemplary displacement paths are oriented or directed radially or tangentially relative to the rotor rotational axis. The balance system controller 46 in real time, utilizing available monitored motor vibration information and sensed weight displacement position from the corresponding sensor 44 (if available) determines a desired balance weight displacement position to counteract the monitored rotor vibration and selectively causes the motor to displace the balancing weight to that desired displacement position. The automatic balancing system is expected to attain steady state operation within a number of rotations of the rotor 38. Given initial efforts to achieve at least first order static balance of the rotor 38 during initial fabrication or after service refurbishment it is not contemplated that balancing weights need to weigh more than approximately one pound and weight displacement along displacement paths are not contemplated to exceed a few inches in the radially oriented embodiment since movement is limited by the physical dimensions of the rotor, but may traverse the entire perimeter of the rotor at the balance plane location for the tangentially oriented embodiment. Accordingly, within appropriately designed weight displacement power requirements micro fractional horsepower motors in combination with high gear ratio should be sufficient to drive weight displacement in most turbo-machinery applications.

Figure 4:
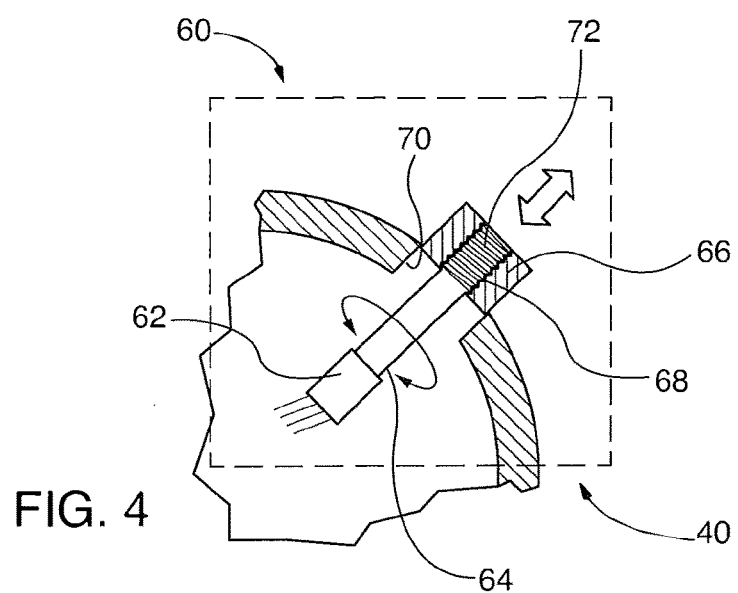
FIG. 4 is a schematic view of a first embodiment of a motorized balancer, in accordance with an embodiment of the invention.

In the first motorized balancer system 60 embodiment of FIG. 4 the driven balancing weight 66 has internal female first drive screw threads 68 that engage with mating male second drive threads defined by a drive screw 72, which in turn is coupled to the motor shaft 64. The balancing weight 66 displaces within a radially oriented bore 70 that is defined in the balancing ring 40. The motor 62 is rigidly coupled to the rotor 38.

Figure 5:
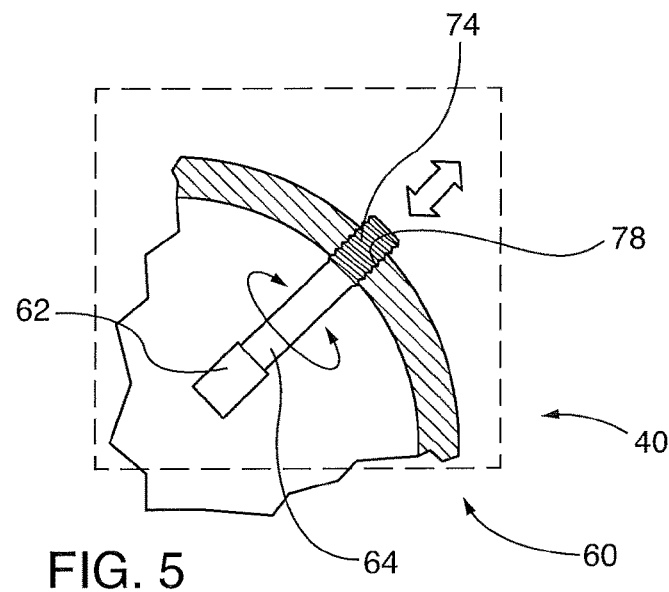
FIG. 5 is a schematic view of a second embodiment of a motorized balancer, in accordance with an embodiment of the invention.
Figure 6:
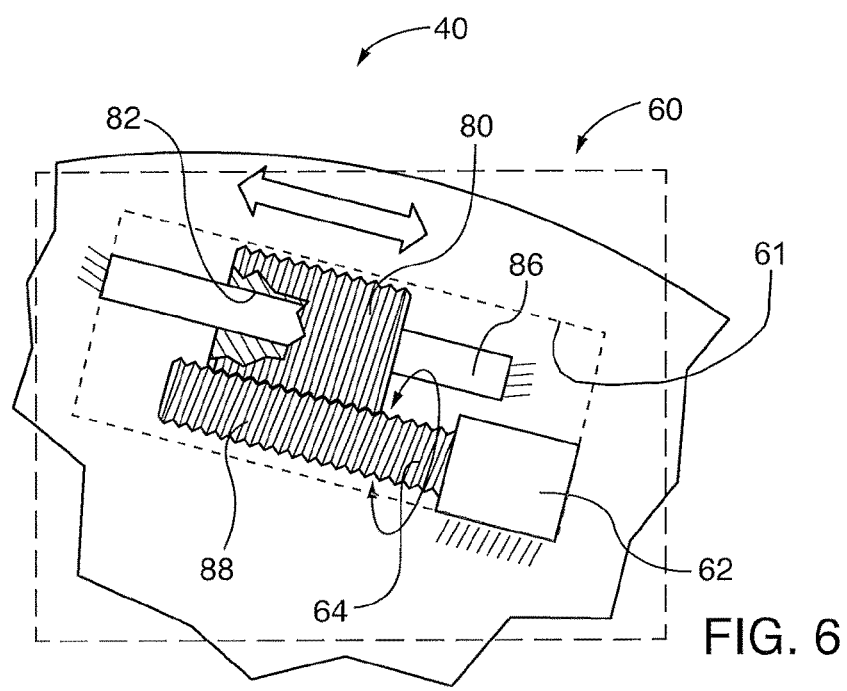
FIG. 6 is a schematic view of a third embodiment of a motorized balancer, in accordance with an embodiment of the invention.
Figure 7:
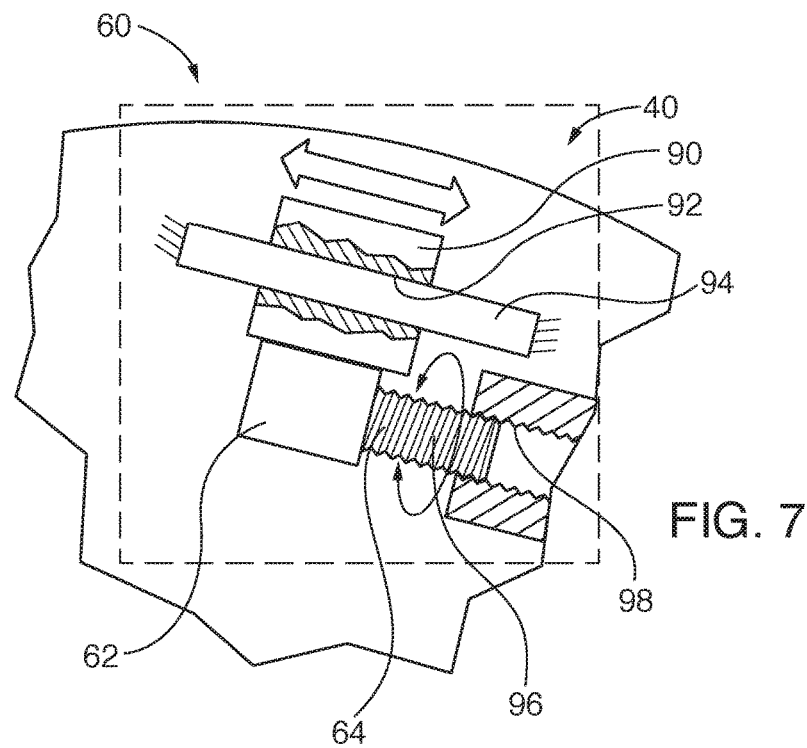
FIG. 7 is a schematic view of a fourth embodiment of a motorized balancer, in accordance with an embodiment of the invention.
Figure 8:
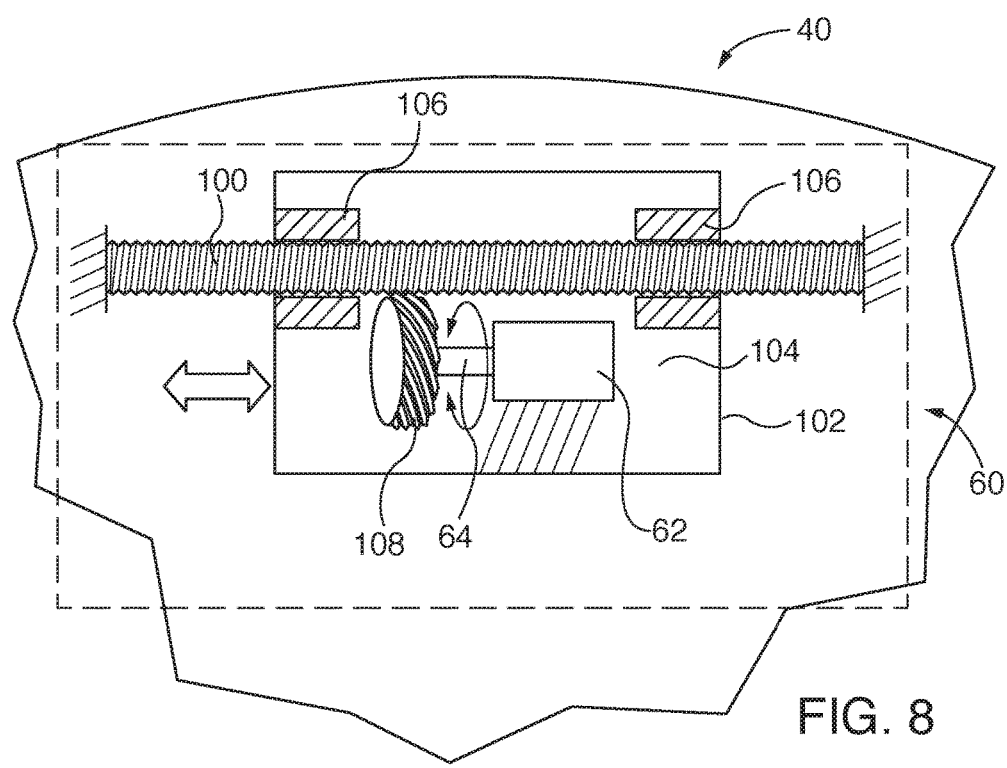
FIG. 8 is a schematic view of a fifth embodiment of a motorized balancer, in accordance with an embodiment of the invention.

In the second motorized balancer system 60 embodiment of FIG. 5, the driven weight 74 defines external circumferential threads 76 that are in mating engagement with the threaded ring bore 78. The motor 62 is rigidly coupled to the rotor 38 with its motor shaft 64 directly coupled to the balancing weight 74. Motor shaft 64 rotation drives the balancing weight 74 along the mating screw thread engaged surfaces.

Figure 9:
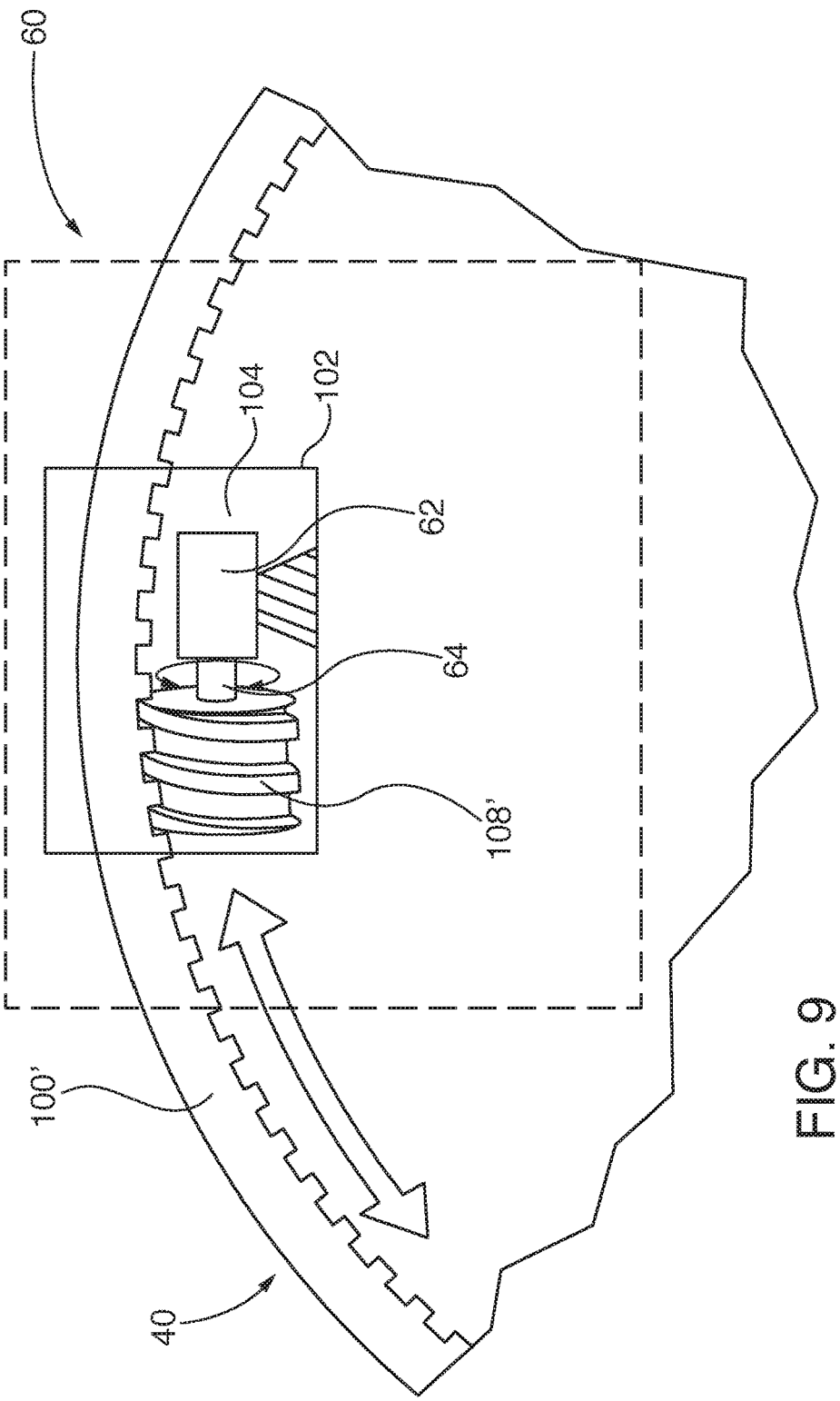
FIG. 9 is a schematic view of a sixth embodiment of a motorized balancer, in accordance with an embodiment of the invention.

Balancing weights in the embodiments of FIGS. 6-9 are displaced in tangential paths along the balance plane relative to the rotor 38 rotational axis along rails that are attached in fixed position on the rotor. The third motorized balancer system 60 is largely disposed in a bore 61 that extends along a long axis that is tangential to the bore 188 of the rotor. In the third motorized balancer system 60 embodiment of FIG. 6 the driven weight 80 has an internal weight bore 82 that rides along the rail 86. Drive screw 88 threads engage mating threads formed on the weight 82. The motor 62 is attached in fixed position to the balancing ring 40, with its motor shaft 64 coupled to the drive screw 88. In the fourth motorized balancer system 60 embodiment of FIG. 7 the driven weight 90 also defines an internal weight bore 92 that rides along the fixed rail 94. The motor 62 is affixed to the driven weight 96, its own motor weight contributing to the aggregate weight of the displaced mass. The motor shaft 64 is coupled to a drive screw 96 and mates with a corresponding fixed position female threaded drive screw block 98. In the fifth motorized balancer system 60 embodiment of FIG. 8 a rotatively mounted combination drive screw and rail 100 is retained in a fixed position within the balancing ring 40. Weight 102 defines an internal cavity 104 within which motor 62 is rigidly coupled. Bearing blocks 102 allow the weight assembly to be displaced along the drive screw/rail 100 by mating engagement of opposing threads on drive gear 108 that is in turn coupled to the motor shaft 64. The sixth motorized balancer system 60 embodiment of FIG. 9 is similar to the system of FIG. 8, substituting a gear segment 100', formed in a rim of the balancing ring 40. The weight 102 is displaced along the segment 100' by mating engagement of opposing threads on drive gear 108' that is in turn coupled to the motor shaft 64.

Exemplary embodiments of the invention include motor 62 power sources, shown in 9 and 10. In FIG. 9, the motor power source is an inductive pulse transmission system, having a stationary coil 110 in the power transfer device 42 and passing in close proximity a moving coil 112 in the balancing ring 40 that is coupled to the motor 62 of one of the weights. The relative motion between the two inductive pulse transmission system components creates a rapidly changing magnetic field with in the moving coil 112, which induces a current pulse and in turn energizes the motor 62. Weight displacement along the displacement path that is caused by the motor shaft 64 can be sensed by a remote sensor 44 or by monitoring the timing of the back EMF to the stationary coil 110 relative to a known angular location of the shaft. Sensed weight displacement is utilized by the balancing system controller 46 in a feedback loop to determine subsequent desired balance weight displacement positions and possible fault conditions, as previously described.

Figure 10:
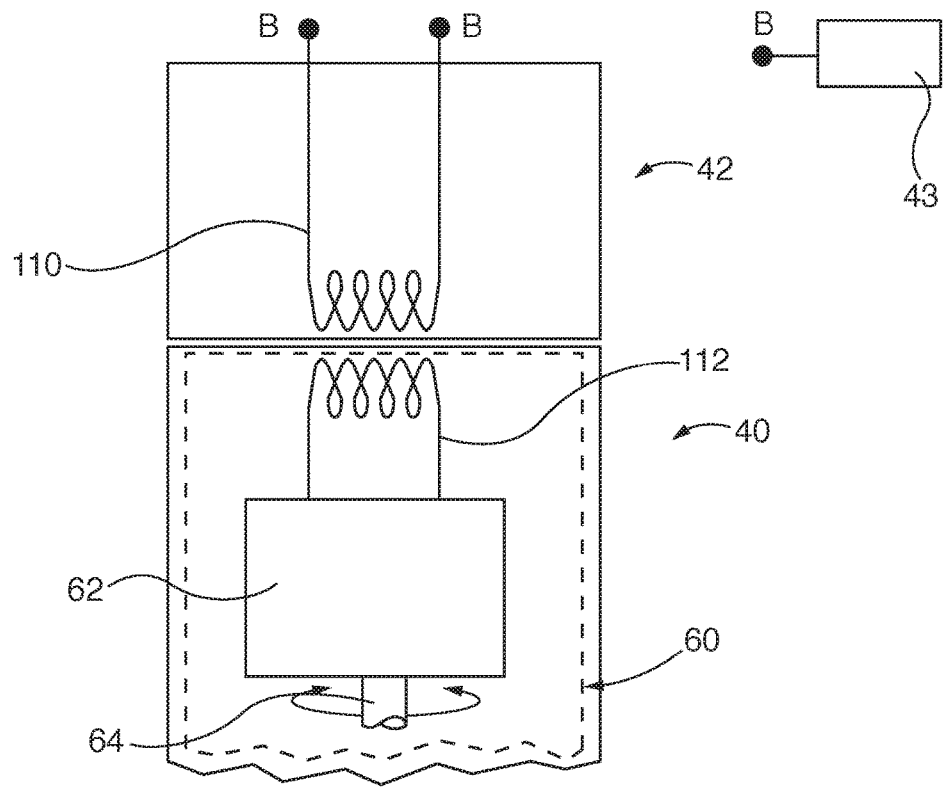
FIG. 10 is a schematic view of an inductive power transfer power source for a motor of a motorized balancer, in accordance with an embodiment of the invention.
Figure 11:
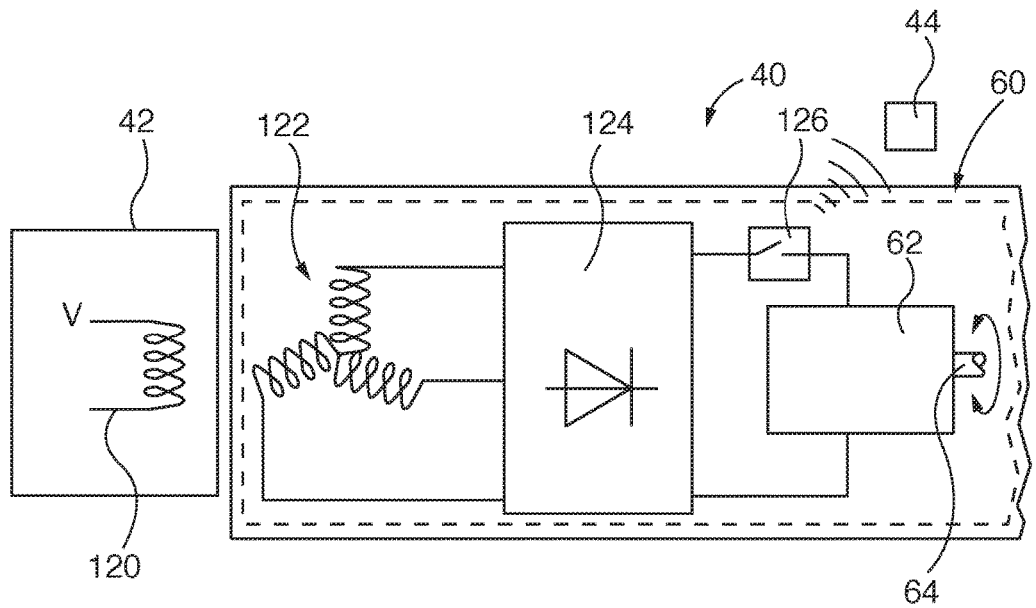
FIG. 11 is a schematic view of a permanent magnet generator power source for a motor of a motorized balancer, in accordance with an embodiment of the invention.

In FIG. 11, the motor power source is a permanent or electro magnet generator power source having a stationary magnet 120 proximal the balancing ring 40 and at least one moving coil 122 that is coupled to the balancing ring. The magnet 120 excites the moving coil 122 and generates an induced current that powers the motor 62. In FIG. 10 the moving coil 122 comprises a known three phase alternating current generating coil arrangement and its induced current is rectified to direct current by a known rectifier 124. Power is selectively switched to one or more motors 62 in one or more balancing rings 40 by one or more power triggering switches 126, such as by known solid state switches. The switch 126 is in turn controlled by switching commands generated by remote sensor 44 (such as a known Hall Effect sensor) as the balancing ring 40 and its rotor 38 rotate past the remote sensor. Alternatively the motors 62 can be powered via known stationary contact brushes and rotor slip rings (not shown).

Although various embodiments that incorporate the teachings of the present invention have been shown and described in detail herein, those skilled in the art can readily devise many other varied embodiments that still incorporate these teachings. The invention is not limited in its application to the exemplary embodiment details of construction and the arrangement of components set forth in the description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings.

We claim:

1. An online real time turbine engine rotor balancing system, comprising:
    a rotor having a rotation axis, a bore extending along the rotation axis, and at least one balance plane;
    a balancing ring perpendicular to the rotation axis and defining the at least one balance plane;
    a selectively displaceable balancing weight coupled to the rotor and displaceable along a linear displacement path formed within the balancing ring and oriented tangential to the bore;
    a motor coupled to the balancing weight and the rotor, for selectively displacing the balancing weight;
    a rotor vibration monitoring system for monitoring rotor vibration in real-time; and
    a control system coupled to the rotor vibration monitoring system and the motor, for determining in real time a desired balance weight displacement position to counteract the monitored rotor vibration and selectively causing the motor to displace the balancing weight to the desired displacement position.

2. The system of claim 1, further comprising:
    a second selectively displaceable balancing weight coupled to the rotor and displaceable along a second linear displacement path, wherein the second displacement path is formed within the balancing ring and is non-orthogonally aligned with the first displacement path.

3. The system of claim 2, wherein the balancing ring is a first of multiple axially spaced balancing rings with each balancing ring defining a balance plane.

4. The system of claim 1, further comprising a balancing weight displacement sensor providing sensed weight displacement information that is coupled to the controller, the controller utilizing the sensed weight displacement information as a control parameter for determining the desired weight displacement position.

5. The system of claim 1, further comprising the balancing weight having first drive threads engaged with mating second drive threads defined by the rotor at the balance plane or a drive shaft of the motor, the balancing weight displaced along the displacement path by relative motion between the first and second drive threads.

6. The system of claim 1, further comprising a rail coupled to rotor and the balancing weight coupled to the rail, the balancing weight displaced along the rail.

7. The system of claim 1, the motor having a motor housing that is attached to the weight.

8. The system of claim 1, further comprising a motor inductive power source having a stationary coil external the rotor and a moving coil coupled to the rotor.

9. The system of claim 1, further comprising a motor permanent or electromagnet generator power source having a stationary magnet near the balance plane and at least one moving coil coupled to the rotor.

10. A method for online real time turbine engine rotor balancing, comprising:
    providing a turbine engine including:
    a rotor having a bore that extends along a rotation axis;
    a balancing ring perpendicular to the rotation axis and establishing a balance plane, said balancing ring including a linear bore tangentially oriented relative to the bore and establishing a linear displacement path in the balance plane;
    a selectively displaceable balancing weight coupled to the rotor and movable linearly along the displacement path;
    a motor coupled to the balancing weight and the rotor, for selectively displacing the balancing weight;
    a rotor vibration monitoring system for monitoring rotor vibration in real-time; and
    a control system coupled to rotor vibration monitoring system and the motor, for determining in real time a desired balance weight displacement position to counteract the monitored rotor vibration and selectively causing the motor to displace the balancing weight to the desired displacement position;
    operating the turbine engine and monitoring operational rotor vibration with the vibration monitoring system;
    determining with the controller in real time a desired balance weight displacement position to counteract the monitored rotor vibration; and
    the controller causing the motor to displace the balancing weight to the desired displacement position.

11. The method of claim 10, further comprising:
    a second tangentially oriented linear bore defined in the balancing ring and establishing a second linear displacement path in the balance plane; and
    a second selectively displaceable balancing weight coupled to the rotor and adapted for being displaced linearly along the second displacement path, wherein the second displacement path is non-orthogonally aligned with the first displacement path;

determining with the controller in real time for each respective balancing weight a desired balance weight displacement position to counteract the monitored rotor vibration; and the controller causing one or more motors to displace each balancing weight to its respective desired displacement positions along the displacement path.

12. The method of claim 11, further comprising:

providing a balancing weight displacement sensor, coupled to the controller, the sensor providing sensed weight displacement information;

the controller utilizing the sensed weight displacement information as a control parameter for determining the desired weight displacement position.

13. The method of claim 10, further comprising:

providing a balancing weight displacement sensor, coupled to the controller, the sensor providing sensed weight displacement information;

the controller utilizing the sensed weight displacement information as a control parameter for determining the desired weight displacement position.

14. A gas turbine engine, comprising:

compressor, combustor and turbine sections;

a rotor, captured within the engine, having a rotation axis and a balance plane;

a balancing ring perpendicular to the rotational axis and establishing a balance plane, said balancing ring including a first linear bore that defines a first linear displacement path in the balance plane;

a first displaceable balancing weight coupled to the rotor and linearly movable along the first linear displacement path;

a second linear bore that defines a second linear displacement path in the balance plane, the second linear displacement path being non-orthogonal with respect to the first linear displacement path;

a second displaceable balancing weight coupled to the rotor and linearly movable along the second linear displacement path;

a first motor coupled to the first balancing weight and the rotor and a second motor coupled to the second balancing weight and the rotor, the first motor operable to selectively move the first balancing weight and the second motor operable to selectively move the second balancing weight;

a rotor vibration monitoring system coupled to the engine, for monitoring rotor vibration in real-time; and a control system coupled to the rotor vibration monitoring system, the first motor, and the second motor and operable to selectively causing the first motor to displace the first balancing weight and to selectively cause the second motor to displace the second balancing weight.

15. The gas turbine engine of claim 14, wherein the balancing ring is a first of multiple axially spaced balancing rings with at least one balancing ring positioned near each end of the engine and the remaining balancing rings disposed between the compressor and turbine sections.

16. The gas turbine engine of claim 15, further comprising a balancing weight displacement sensor system providing respective sensed weight displacement information that is coupled to the controller, the controller utilizing the respective sensed weight displacement information as a control parameter for determining the respective desired weight displacement positions.

17. The gas turbine engine of claim 14, further comprising a motor power source comprising:

an inductive power source having a stationary coil external the rotor and a moving coil coupled to the balancing ring; or a permanent or electromagnet generator power source having a stationary magnet proximal the balancing ring and at least one moving coil coupled to the balancing ring.

18. The gas turbine engine of claim 14, wherein the first linear bore is oriented in a direction tangential to a bore that extends along a rotation axis of the rotor.

19. The gas turbine engine of claim 18, wherein the second linear bore is oriented in a direction tangential to the bore and wherein the second linear bore is oriented at an oblique angle with respect to the first linear bore.

20. The gas turbine engine of claim 14, wherein the first linear bore extends along a radial line of the rotor with respect to the rotation axis.

* * * * *